United States Patent
Crum

(10) Patent No.: US 8,149,104 B2
(45) Date of Patent: Apr. 3, 2012

(54) ROOM MANAGEMENT SYSTEM

(76) Inventor: David A Crum, Scottsdale, AZ (US)

( * ) Notice: Subject to any disclaimer, the term of this patent is extended or adjusted under 35 U.S.C. 154(b) by 456 days.

(21) Appl. No.: 12/491,157

(22) Filed: Jun. 24, 2009

(65) Prior Publication Data

US 2009/0261965 A1 Oct. 22, 2009
US 2011/0279260 A2 Nov. 17, 2011
US 2012/0044067 A2 Feb. 23, 2012

Related U.S. Application Data

(63) Continuation-in-part of application No. 12/340,528, filed on Dec. 19, 2008, now abandoned.

(60) Provisional application No. 61/008,770, filed on Dec. 21, 2007.

(51) Int. Cl.
*G08B 25/00* (2006.01)
*G08B 5/00* (2006.01)
*G08B 3/00* (2006.01)

(52) U.S. Cl. .............. 340/525; 340/286.07; 340/286.08; 340/330; 340/332; 340/309.16; 340/309.4

(58) Field of Classification Search .................. 340/525, 340/286.07, 286.08
See application file for complete search history.

(56) References Cited

U.S. PATENT DOCUMENTS

| | | |
|---|---|---|
| 2,910,680 A | 10/1959 | McLain |
| 3,228,020 A | 1/1966 | Heimer |
| 3,588,868 A | 6/1971 | Head |
| 3,599,199 A | 8/1971 | Bunting |
| 3,599,200 A | 8/1971 | Bunting |
| 3,705,422 A | 12/1972 | Savey |
| 3,742,141 A | 6/1973 | Duncan |
| 4,194,181 A | 3/1980 | Burndage |
| 4,967,195 A | 10/1990 | Shipley |
| 5,103,204 A | 4/1992 | Hartman |
| 5,202,660 A | 4/1993 | Hartman |
| 5,760,704 A | 6/1998 | Barton |
| 5,831,534 A | 11/1998 | Mooney |
| 2004/1022897 | 11/2004 | Schuhmann |

*Primary Examiner* — Donnie Crosland
(74) *Attorney, Agent, or Firm* — Barbara J. Luther; The Luther Law Firm, PLLC

(57) ABSTRACT

Apparatus and method for managing utilization of rooms in a clinic, for example, include a visible display, for example, colored lights at an examining room, indicating one or more of several available room status values for the room. An input device including, e.g., push buttons, is coupled to the display and adapted for selecting the room status value. A timer coupled to the input device and display automatically changes the status value of a room when a predetermined time period has elapsed after the status value is first selected, except when a third room status value is selected. This feature notifies personnel if, for example, a patient has been left alone in a room too long. A central control provides a database to accumulate minute-by-minute utilization data of the clinic rooms and also programs to access and compute from the data the overall utilization by variable periods. This utilization data are useful for planning, reallocation and investment in new space.

20 Claims, 15 Drawing Sheets

ROOM MANAGEMENT SYSTEM

CROSS REFERENCES TO RELATED APPLICATIONS

This application is a continuation-in-part of U.S. application Ser. No. 12/340,528 filed on Dec. 19, 2008, now abandoned, which claims the benefit of Provisional Application No. 61/008,770 filed Dec. 21, 2007. The prior applications are hereby incorporated by reference in their entirety.

TECHNICAL FIELD

This invention is in the field of tracking utilization of procedure and out-patient exam rooms, and more particularly systems for reporting status such as patient-in-room, doctor-visiting, and cleaning-needed.

BACKGROUND OF THE INVENTION

Efficient utilization of clinical examination rooms is increasingly a challenge for clinics and hospitals. The demand for outpatient examination rooms, physicians, nurses and other staff that are directly involved in using or managing the examination room also expands. This critical trend forces management of clinics and hospitals to consider making major staff or facility expansions and/or capital expenditure decisions. These decisions, however, often are made without solid information on how their examination rooms are being used, e.g., how long patients are waiting for a room to become available, how long it has been since housekeeping was notified that a room needs cleaning or maintenance, and so forth.

Without solid information concerning the manner in which examination rooms are being used, the administration of a clinic or hospital lacks detailed information concerning facility utilization. As a result, multi-million dollar decisions cannot be rationalized as to whether or not another facility needs to be built, whether or not more staff needs to be hired and for what areas, and whether or not rooms can be reallocated or reconfigured at some facilities from one use to another. For example, can a room be re-allocated from oncology to cardiology? From cardiology to podiatry? From office space to exam rooms?

Many institutional actors, such as patients, physicians, nurses, receptionists, housekeeping and maintenance interact with an examination room. The coordination of all the activities, as it pertains to an examination room (that is, patient transport, patient examination, clean up, and equipment repairs), is not typically a data-driven series of events. Without hard data, however, medical staff, housekeeping and maintenance staff and administrators are hampered in their ability to make intelligent decisions on how the assets and resources are most effectively utilized.

For patients, present facility uses often mean that patients are not transported as quickly as otherwise might be possible to available examination rooms. Frequently, personnel select an exam or procedure room by searching for an empty room on foot walking down a corridor. Patients often experience unnecessarily long wait times for physicians and nurses through improper or inefficient room utilization.

It is desirable to provide a system that enables hospitals and clinics to maximize efficient utilization of examination rooms, saving time and money, improving the overall use of human and financial resources, and improving the patient experience.

SUMMARY OF THE INVENTION

All of the examination rooms in a hospital or clinic facility are linked to a central control system, where the individual status of each of the rooms is displayed at any given time on any desk top. At each of the rooms, a status indicator is provided; and multiple countdown timers are employed to indicate status at any monitoring station and, on a display outside the door of a room itself, as to the various states of occupancy of the room at all times.

For example, each empty room has at least one indicator at the room itself and at the control station. When a patient is placed in the room, the patient-in-room (PIR) status is shown, and a countdown timer commences for counting down the maximum allowed time a patient should be alone in the room. When a caregiver enters the room, caregiver (CG) status is shown outside the room and at all monitoring stations; and the caregiver identity is indicated on the outside of the room by color bars coded to the particular caregiver. When the room is empty and if it needs cleaning, this is signaled with the room cleaning required (RCR) indicator. Optionally, another countdown timer is initiated to establish the maximum length of time that the room awaits cleaning. Additional status indicators for maintenance and the like (out-of-service) also are provided so that the current status of the room may be observed on the outside of the room, as well as at monitoring stations.

In accordance with the present invention, exemplary apparatus for observing utilization of one or more rooms includes at least one visibly indicating display adapted for location proximate a room and adapted for indicating at least one room status value selectable from a plurality of room status values; a manually operable input device operatively coupled to the display and adapted for selecting the at least one room status value selected from the plurality of room status values; and a timer operatively coupled to the input device, operatively coupled to the display, and adapted, with reference to the plurality of room status values, to select a predetermined second room status value when a predetermined time period has elapsed after a first room status value has been selected, except when a third room status value is selected from the plurality of room status values during the predetermined time period. This apparatus, as described here and as more fully developed below, not only notifies office personnel as the rooms in the facility become, for example, vacant, reserved, occupied by a patient alone, occupied by a caregiver seeing a patient, in need of cleaning, in need of urgent attention, or out of service, but can also notify them of important changes in the status of a room, such as, for example, when a patient is left alone in a room for more than fifteen minutes, or the like.

Exemplary apparatus in accordance with the present invention are adapted to provide a machine-retrievable data record of room status values for a room with respect to time. This record is later reported and analyzed to assist management, modification and planning of the facility.

Exemplary apparatus in accordance with the present invention has a visibly indicating and manually operable central monitoring station, operatively coupled to the display, the input device and the timer, adapted for indicating at least one room status value selectable from a plurality of room status values, and adapted for selecting at least one room status value. This central station allows a manager to observe and alter the reported status of any of a plurality of rooms.

In exemplary apparatus in accordance with the present invention, the predetermined plurality of status values includes at least one provider identifier. Thus, the provider presses one or more buttons upon entering or leaving a room, with the effect that one or more rooms status values is displayed indicating not only what is happening in the room but which caregiver, or provider, is present or is giving the indication.

In exemplary apparatus in accordance with the present invention, the predetermined plurality of status values includes at least one status value selected from the set including "reserved room," "patient in room," "caregiver in room," "timer exceeded," "cleaning required," "pull cord," and "room out of service." Other values are added to the set as needed by management.

Exemplary apparatus in accordance with the present invention the display has a plurality of lights, respective ones of the lights corresponding to respective ones of the room status values.

In exemplary apparatus in accordance with the present invention, the input device has a plurality of momentary contact switches, respective ones of the switches corresponding to respective ones of the room status values.

In exemplary apparatus in accordance with the present invention, the timer is adapted to select the second status value "timer exceeded" when a predetermined time period has elapsed after a first room status value of "patient in room" has been selected. This operation is useful in avoiding patient discomfort and frustration.

Exemplary apparatus in accordance with the present invention has a manually operable pull-cord alarm located proximate a room, operatively coupled to the display, and adapted to select the room status value "pull cord" when manually operated.

In exemplary apparatus in accordance with the present invention, the monitoring station is adapted to display a plurality of room status values of a plurality of rooms, respective ones of the plurality of displayed room status variables being discernibly associated with respective ones of the plurality of rooms. This provides flexible, comprehensive awareness of the status of rooms in the facility.

An exemplary method of managing utilization of one or more rooms in accordance with the present invention has the steps of selecting proximate a room at least one first room status value selectable from a plurality of room status values; displaying proximate the first room the selected room status value; and automatically selecting a second room status value selectable from the plurality of room status values when a predetermined time period has elapsed after a first room status value has been selected, except when a third room status value is selected from the plurality of room status values during the predetermined time period.

An exemplary method in accordance with the present invention has the step of providing a machine-retrievable data record of a room status values for a room with respect to time.

An exemplary method in accordance with the present invention has at least one further step selected from the set of steps including (a) at a central station selecting a room status value, and (b) at the central station and proximate the room indicating the selected room status value.

In an exemplary method in accordance with the present invention, a room status value includes at least one provider identifier.

In an exemplary method in accordance with the present invention, the predetermined plurality of status values including at least one status value selected from the set including "reserved room," "patient in room," "caregiver in room," "timer exceeded," "room cleaning required," "pull cord," and "room out of service."

An exemplary method in accordance with the present invention has the step of illuminating at least one of a plurality of lights, respective ones of the lights corresponding to respective ones of the room status values.

An exemplary method in accordance with the present invention has the further step of operating one or more of a plurality of momentary contact switches, respective ones of the switches corresponding to respective ones of the room status values.

In an exemplary method in accordance with the present invention, the step of automatically selecting includes selecting the second status value "timer exceeded" when a predetermined time period has elapsed after a first room status value of "patient in room" has been selected.

An exemplary method in accordance with the present invention includes the step of manually operating a pull-cord alarm located proximate a room and operatively coupled to the display, and selecting the room status value "pull cord" when the pull-cord alarm is operated.

An exemplary method in accordance with the present invention includes the step of displaying at the monitoring station a plurality of room status values of a plurality of rooms, respective ones of the plurality of displayed room status variables being discernibly associated with respective ones of the plurality of rooms.

DETAILED DESCRIPTION

Figure 1:
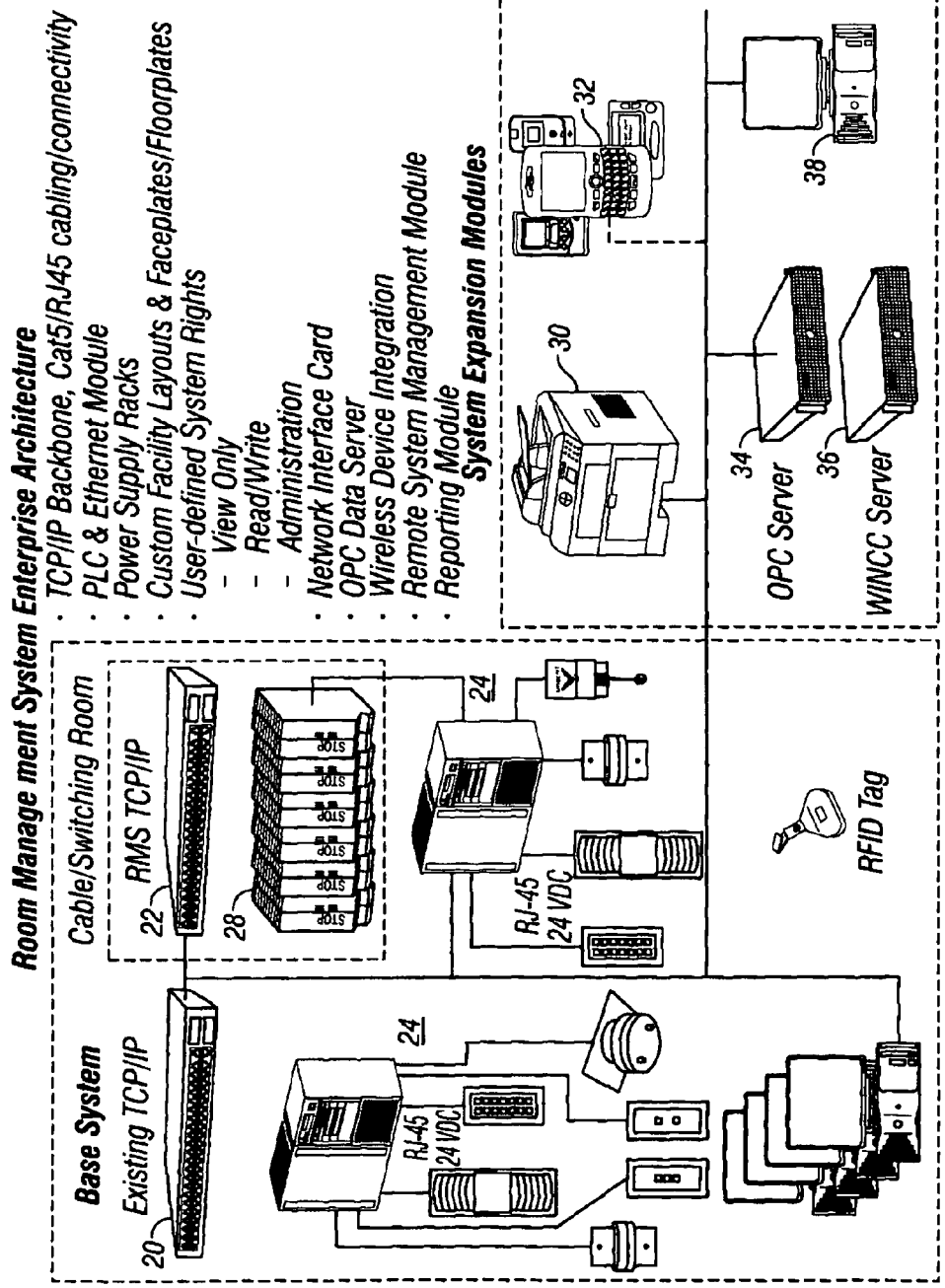
FIG. 1 is a block diagram of a system of an embodiment of the invention.

In a unique combination of innovative systems and hardware, the inventive system and method for tracking exam room usage provide sophisticated reporting and energy savings capabilities to maximize the efficient utilization of examination rooms and communication, thus saving time and money and improving the overall use of human and financial resources.

This room management system is fully integrated. It includes a unique LED light tower and keypad for visually presenting the status inside an exam room from outside each exam room and beyond—to a central desk, as well as to individual caregivers' connected workstations or even to handheld communication devices. In addition to showing the current status of a room, the system also supports local and remote room reservations. A full spectrum of controllable color segments represents room usage data for the clinic. The Administrative reporting module provides full real-time and historical room utilization reporting enabling healthcare clinics to make data-supported, informed decisions about facility reconfiguration and/or expansion. Rooms and their utilization are shown as they actually exist in custom floor plate graphics.

Such a system has been found to increase patient satisfaction by decreasing patient wait time, maintaining contact with patients awaiting the caregiver, and avoiding interrupting the patient and caregiver to check on room status that is displayed outside the room and at the central station.

The system has also been shown to increase healthcare provider satisfaction by contacting physicians at their office workstations as to the available patient and exam room, by assigning specific lights and light combinations to specific caregivers (who can immediately find their patients with this visual cue), and by providing light towers with configurable keypads and in-room controller to quietly and efficiently communicate locally and remotely the room status and patient progression.

Other unique features of the system include reports to help various medical personnel optimize the room use, and personnel levels. The system lets personnel review room occupancy in any number of configurations—individually, suites of rooms, departments, floors, wings or the entire clinic. The system can also provide customized reports for various clinic functions (finance, clinical administration, medical, nursing, housekeeping, maintenance, etc.). Examples of the types of reports available include historical and real-time key performance indicators, staffing levels, room allocation and utilization, average patient wait times, and room status.

The system can also reduce healthcare provider costs by reducing wait times. Remote room status and timers can allow housekeeping and caregivers to maximize use of the rooms from any network-connected PC or other appliance. Personnel can make remote room reservations without walking to the actual room and are limited in the time they can keep a room out of circulation. Other tools to decrease costs include making customized alerts, such as wireless signaling of room status to cell phones, pagers, PDA, and other hand-held devices. Caregivers also save time because they can check room status remotely, without walking to or down a hallway.

The system is designed to reduce maintenance costs when LEDs with long lives are used and maintenance personnel only need to perform a single sign on to the active directory to check requirements. Importantly, energy savings accrues when the system is used to decrease lighting in unoccupied rooms (also requiring less air conditioning) and when the room indicator lights are LED.

Reference now should be made to the drawings, wherein the same reference numbers are used throughout the different figures to designate the same or similar components. The system shown in FIG. 1 uses web-enabled software to permit users of the system to monitor, control and record the status of any room which is equipped with the room management system components of an embodiment of the invention. The status can be monitored and controlled from any web-enabled nursing station, mobile phone (monitor only) or other web-enabled device (monitor only).

In general, the system uses a plug-n-play (via RJ45 connectors), high intensity light tower sconces at each room which integrate directly with a controller and associated software. Room occupancy status, in the embodiment disclosed in FIGS. 1 through 14, is signaled by simply pressing well-labeled buttons on a keypad outside the door of each room. The keypad also is integrated into the system. Inputs are received either directly from the keypad, or remotely from a connected PC (Personal Computer) at a monitor station 26. The resulting outputs are lights which are turned on physically at the light tower, and are also connected logically in the system software to be viewed on any connected PC at a monitor station 26. These inputs and outputs are controlled through a programmable logic controller (PLC) 28 and are communicated via an Ethernet module and Ethernet connection, and are stored for history and reporting purposes via an object linking and embedding for process control (OPC) server.

The room management system of the disclosed embodiment is a tool for communicating patient flow, managing work flow and improving clinical processes. A specific workflow example is described subsequently, from the time a patient checks in through the end of a patient visit, to subsequent readiness for the next patient visit. Through this process, the varying status of the room is tracked throughout each day; and the data is retained for time-based room utilization reporting. Room occupancy data based on the statuses of the lights on a per-room basis are seamlessly collected and synthesized within the system's PLC and OPC server. A variety of standard reports are available to be generated on command from the stored data.

Room usage reports enable administrators to manage and adjust resources, as needed. In addition, the reports allow for robust resource planning, adding an important level of data to expensive decisions involving choices of reconfiguration of existing facilities, facility expansion and/or construction of new buildings.

FIG. 1 is a diagrammatic representation of a room management system enterprise architecture of an embodiment of the invention. The base system includes an existing TCP/IP unit 20, which is connected to a cable switching room (RMS TCP/IP) 22 and to a plurality of room control units 24 (two of which are shown in FIG. 1), as well as to a computer monitoring/control station(s) 26. In the cable switching room, connections are made to the various rooms 24 through a controller 28. This portion of FIG. 1 constitutes the base system.

In addition to the base system, however, expansion modules in the form of a reporting module 30 and wireless devices (i.e., cell phones or PDAs) 32, along with OPC servers or WINCC servers 34 and 36 may be provided. Also, a remote system programming station 38 interconnected as described above may be provided. The base system, however, comprises the elements 10, 22, 24, 26 and 28.

Figure 3:
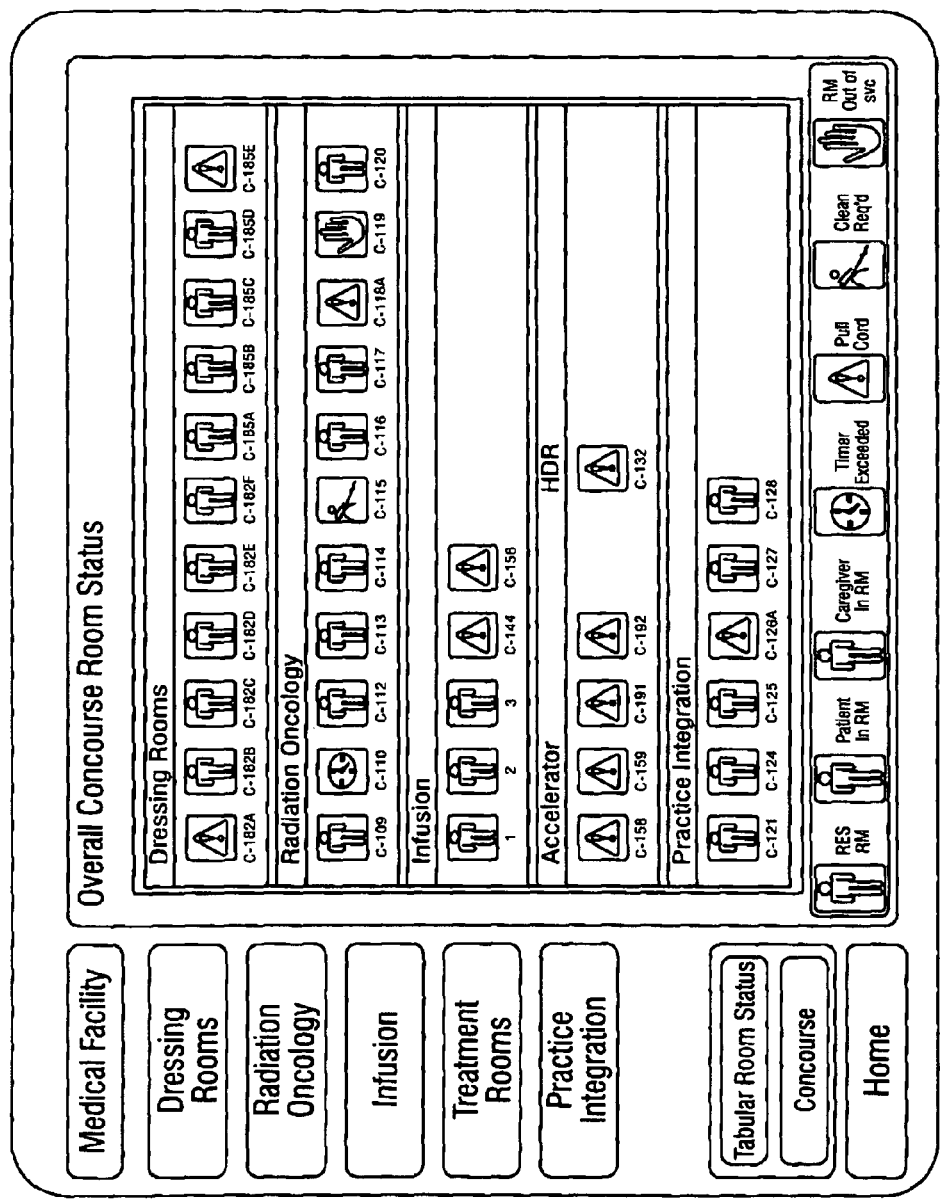
FIG. 3 is a diagrammatic depiction of a display at a monitoring station of the embodiment of FIG. 1.

FIG. 3 is a representation of a display of the type which may be provided at the monitor 26 of FIG. 1. The display in FIG. 3 is used for a facility having a variety of different types of rooms identified in FIG. 3 as dressing rooms, radiation, oncology, infusion, accelerator, and practice integration. At the bottom of FIG. 3 are icons which represent the status which is provided by the system to enable a person at the monitoring station 26 to understand, at any given time, the status of the various rooms shown. For the purpose of this description, the room set identified as "Radiation Oncology" will be considered.

As shown in FIG. 3, the status (referring to the icons at the bottom of FIG. 3) of Rooms C109 and C116 is that there are patients in the rooms. Room C110 has patient along with time-exceeded status and requires some type of attention. Rooms C112 and C114 are empty. Room C113 has been reserved. Room C115 requires cleaning, as shown by the status indicator. Rooms C17 and C120 have a caregiver therein. Room C118A has a pull-cord alarm indicating a patient needs immediate help from a caregiver; and Room C119 is out of service (such as awaiting a repair). The status of all of these rooms can be instantly ascertained by an operator at the monitor station 26 viewing the radiation oncology line.

Figure 4:
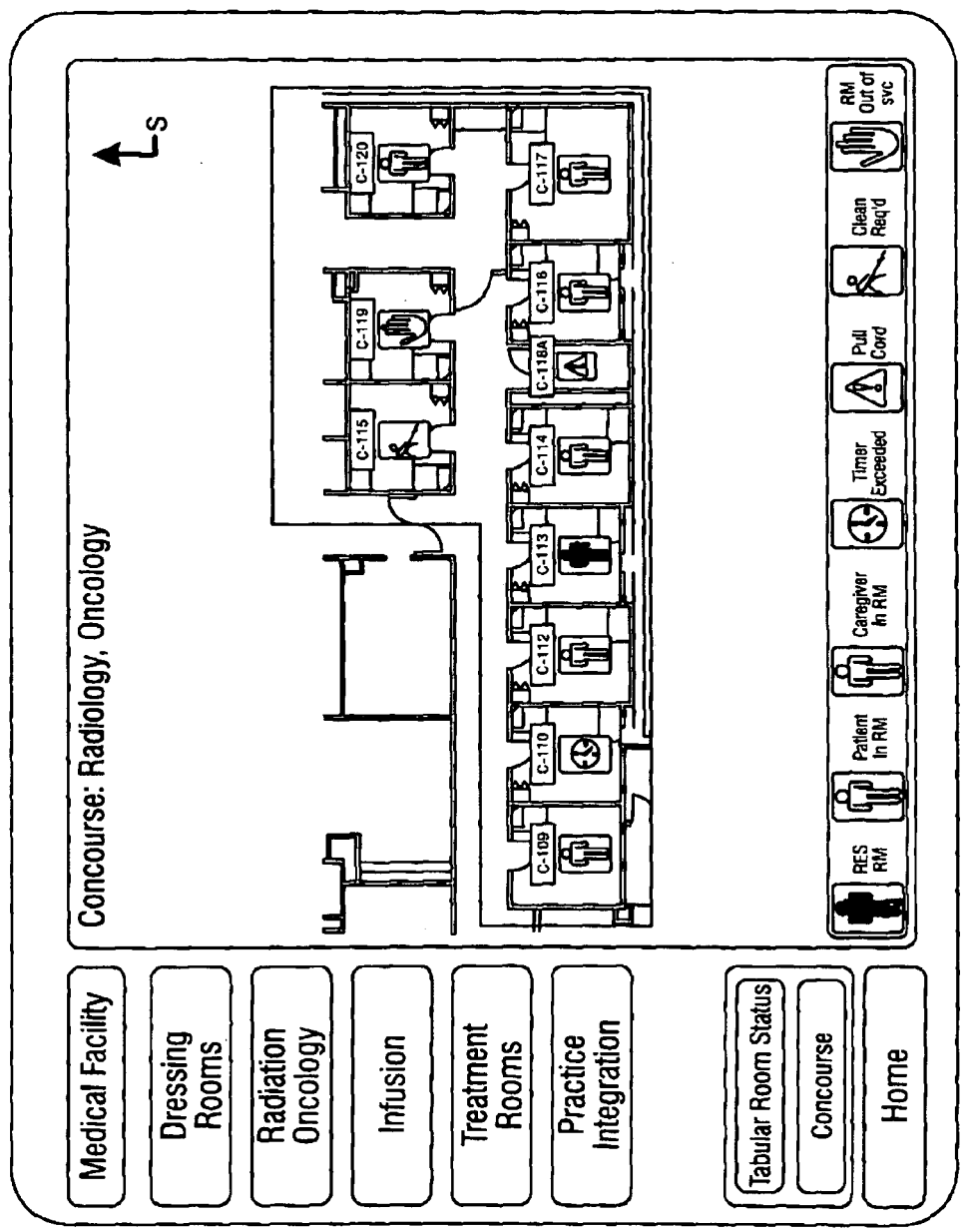
FIG. 4 is a representation at a monitoring station of the status of a block of rooms of the embodiment of FIG. 1.

FIG. 4 is similar to FIG. 3 in the data shown, except that it is limited specifically to the radiation oncology rooms. The room status described above in conjunction with FIG. 3 is also displayed in FIG. 4; and whenever an operator at the monitor 26 desires to view the status only of this set of rooms, the screen which is shown in FIG. 4 is pulled up by operating the "radiation oncology" button on the left side of the screen of the display.

Figure 5:
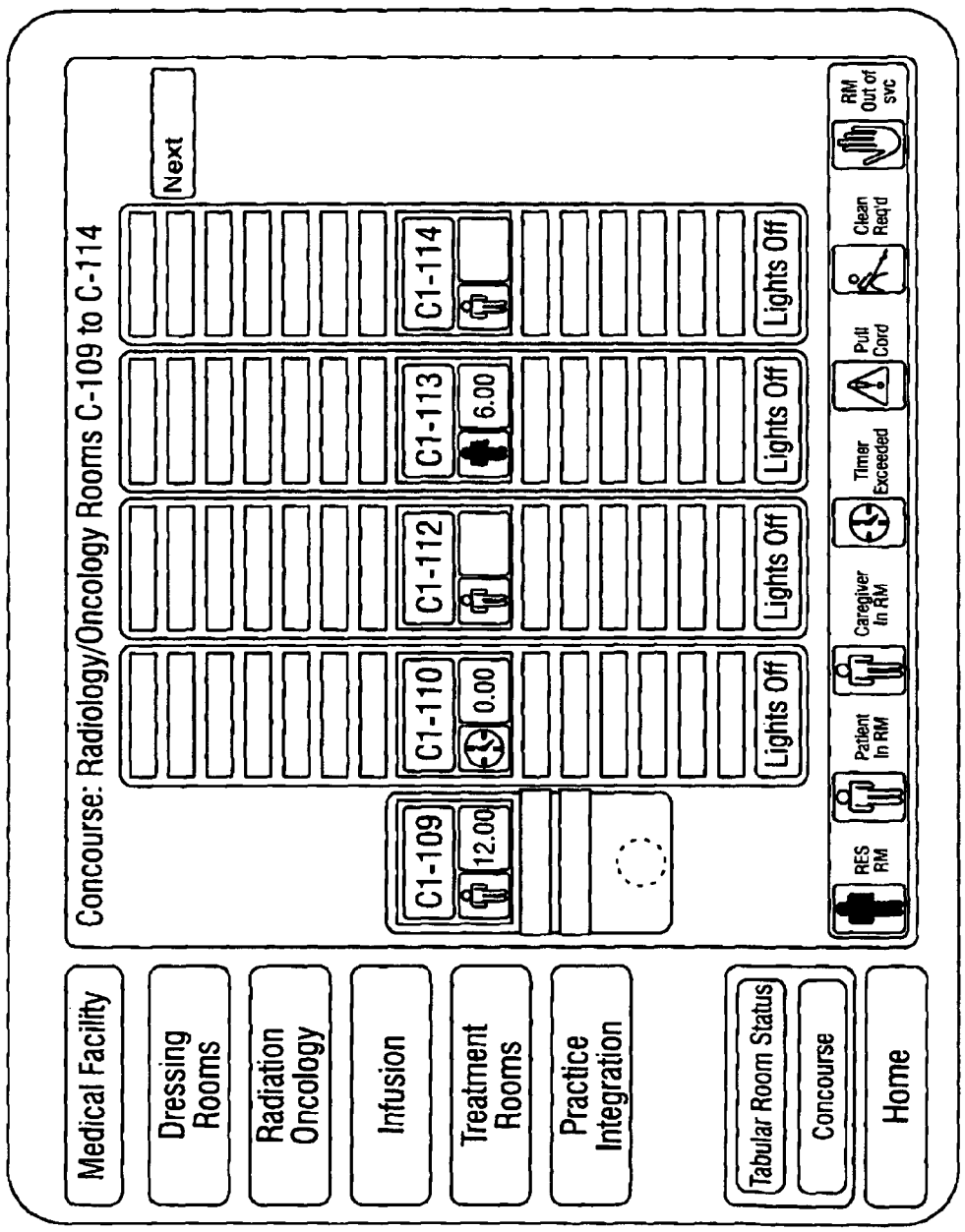
FIGS. 5, 6 and 7 are representations of the status of light bars at each of the rooms depicted in FIG. 4.
Figure 6:
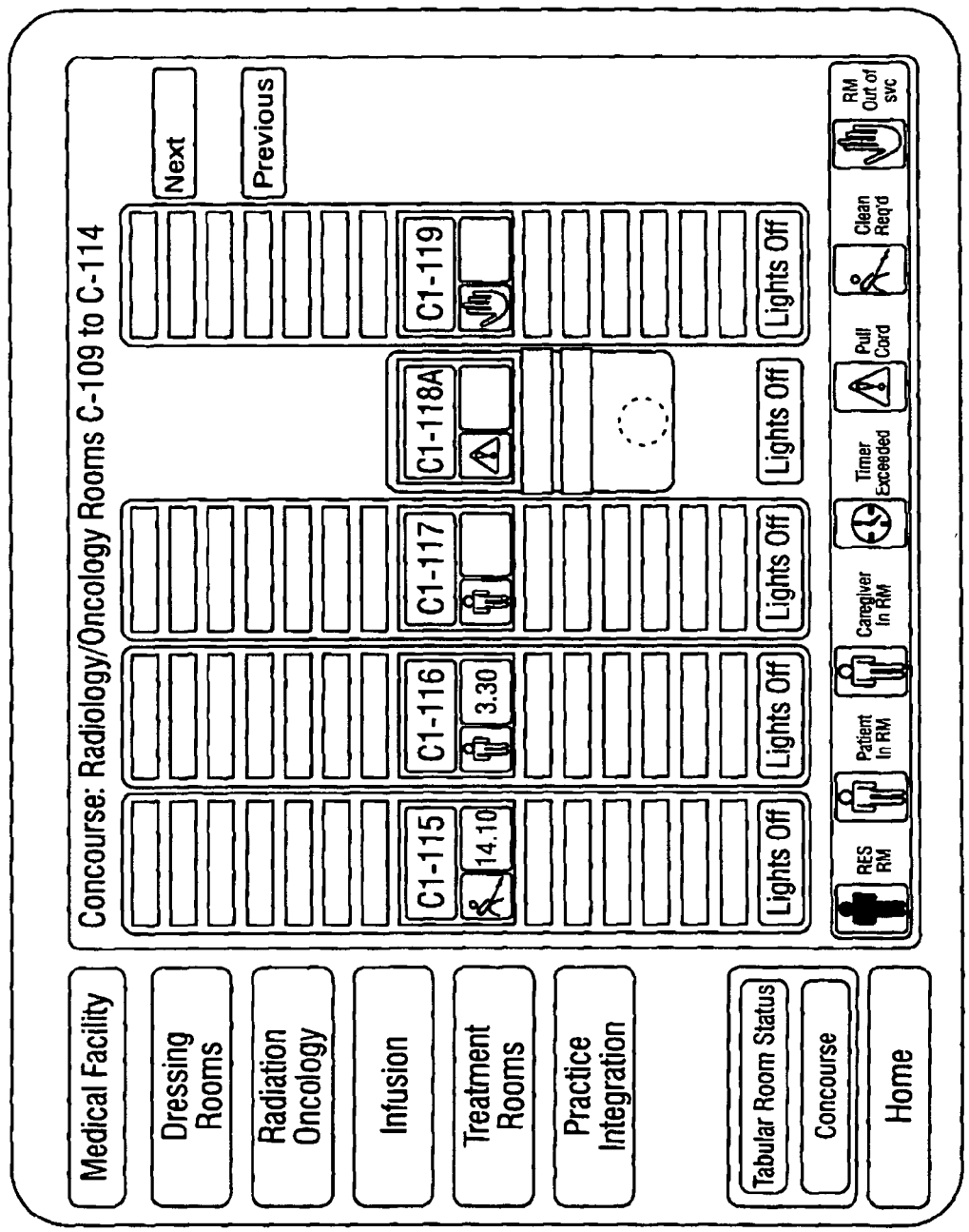
Figure 7:
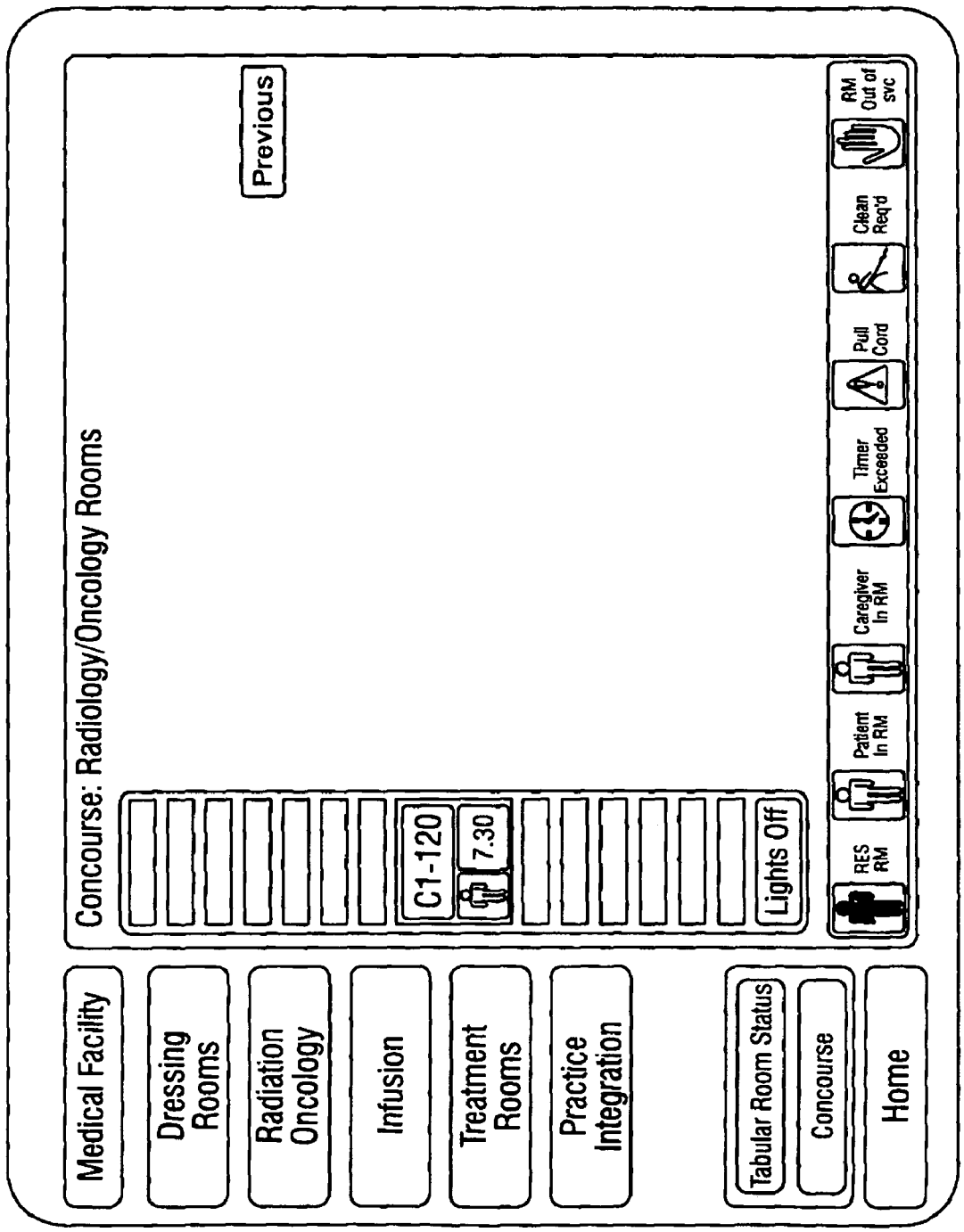

FIGS. 5, 6 and 7 are an alternative display for rooms C109 through C120, also which may be depicted on the monitors 26, but which are also showing the indicia which is present on the light tower sconce located outside the door of each room. The depictions shown for these different rooms are described below in conjunction with the flow chart of FIG. 2.

Figure 8:
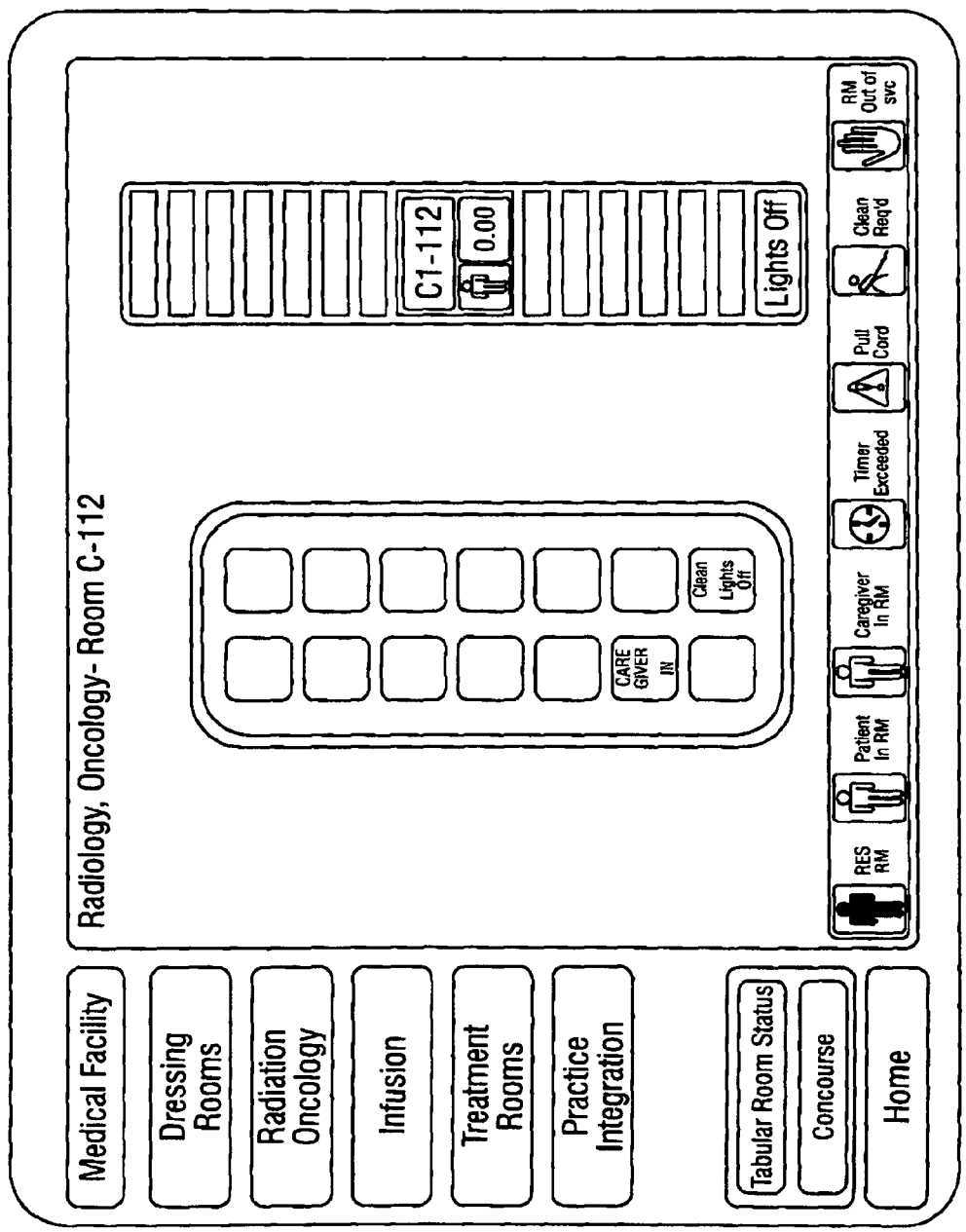
FIGS. 8 through 14 are representations of the control panel and display at a room indicative of its use or status.

Whenever a room is reserved, such as room C113 in FIGS. 3, 4 and 5, the purple light is turned on, either from the control monitor 26 or from a control panel located adjacent the light tower sconce outside the room door. Such a control panel is shown in the left side of the screen depiction in FIG. 8. This reservation of a room is shown at 40 in FIG. 2. At the time the reserve light is turned on at the room and at the display at the monitor 26, a start reserve timer is initiated. This timer continues to provide a countdown of the time the room is in the reserve status for subsequent data reporting of the utilization of the room. When a patient enters the room at 42, the white light button shown at the top of the button panel in FIG. 8 is depressed, whether outside the room or at the monitor station 26, and the purple light is turned off automatically. For purposes of discussion of FIG. 2, reference should be made specifically to the display FIGS. 8 to 14, which are shown in the present example for the status of room C112. FIG. 8 shows the room when it is in its empty status with all of the lights on the light tower sconce (shown on the right-hand side of FIGS. 8 through 14) turned off. Consequently, it is apparent to anyone walking down the hall or at the monitor station 26 that this room is empty and available for use.

Figure 9:
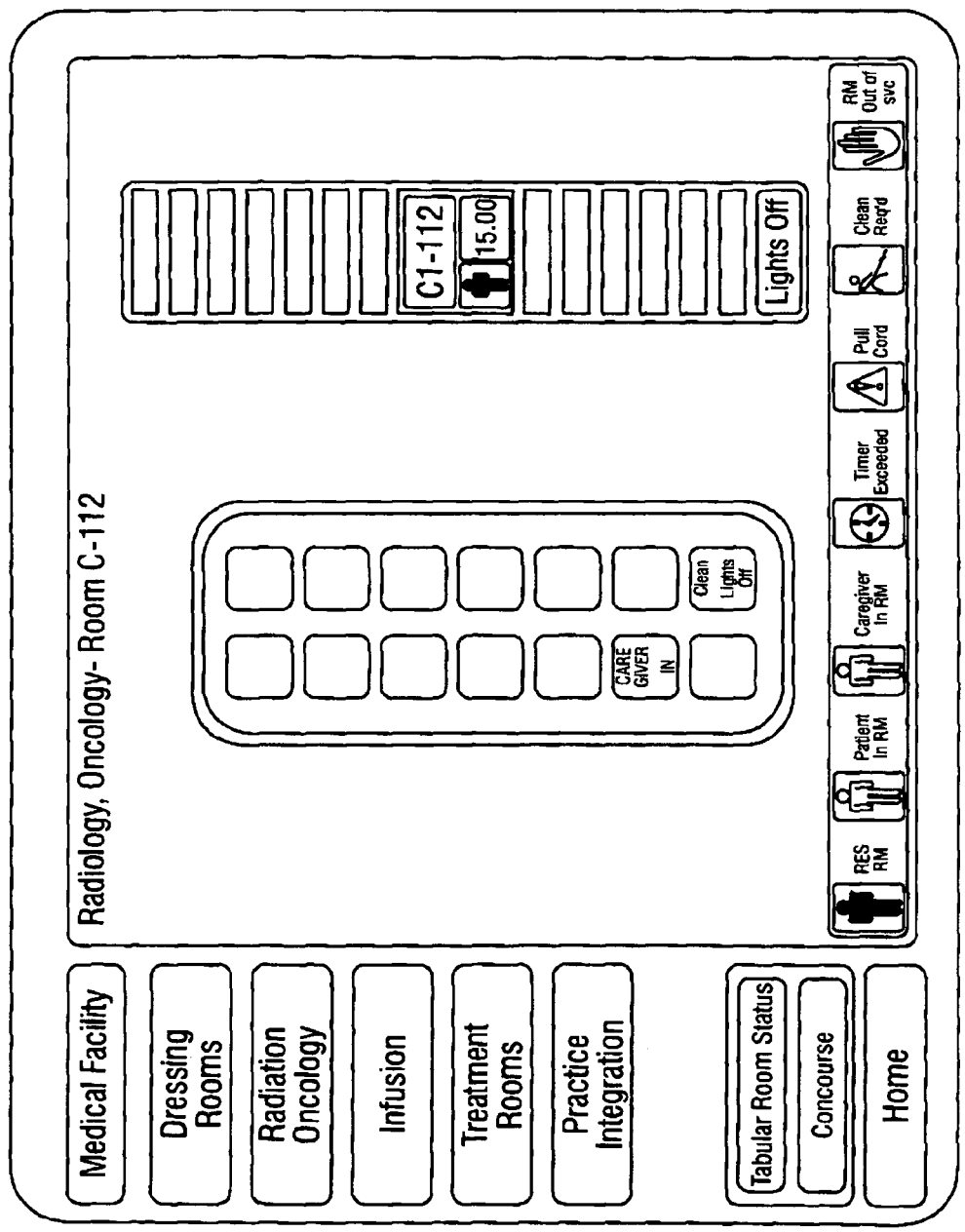
Figure 10:
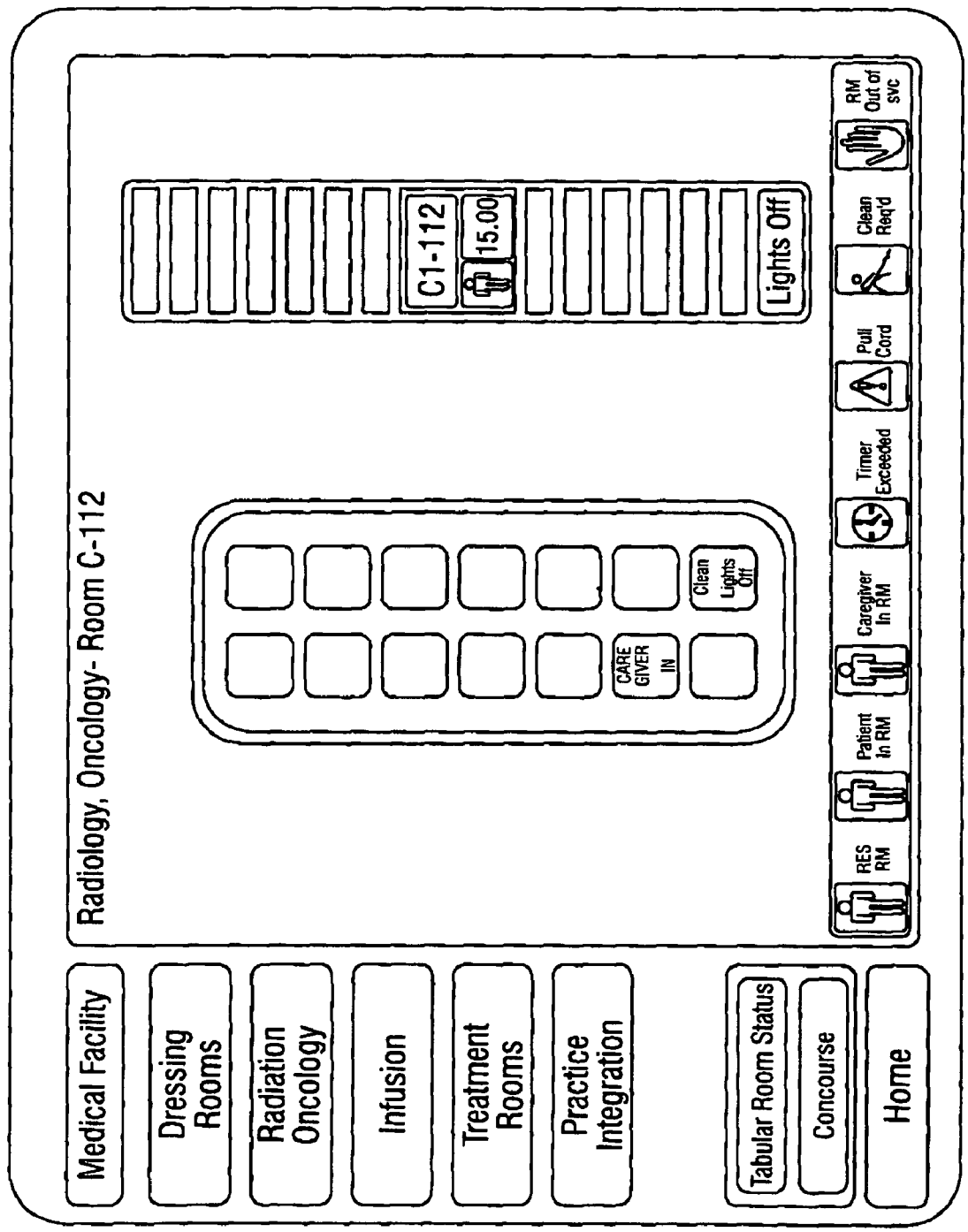

As shown in FIG. 9, whenever a room is reserved, the purple light shown at the top right of the light tower sconce is turned on; and the timer shows the elapsed time for this reserved status. When the patient is placed in the room at 42 in FIG. 2, the white light button (FIG. 10) is turned on and a white light is shown at two places, near the top right of the light tower sconce and immediately below the icon showing the patient in room. A colored button (red in FIG. 10) for the caregiver assigned to the patient also is depressed and a light bar of that color is displayed on the light tower.

A countdown timer PIR is started. Typically, a timer is set for fifteen minutes or less, depending upon the manner of use of the facility. This timer continues to count down the time at 44 in FIG. 2. If the timer exceeds the countdown, the timer-exceeded symbol appears on the room; and the top white light on the light tower flashes to indicate that the patient has been left alone in the room for more that the maximum time desired by the facility. When this occurs, the only way to stop the top white light from flashing is for a caregiver to physically go to the room and press the top yellow keypad button signifying "caregiver in room" (CIR). At the same time, the countdown timer is reset, bringing the system back to 44, as shown in FIG. 2.

It should be noted that whenever a patient is placed in a room, the colored push button for the particular caregiver(s) who is to attend to that patient is pressed to cause the light for that caregiver to be turned for the room. This is the red light shown in FIG. 10.

Figure 2:
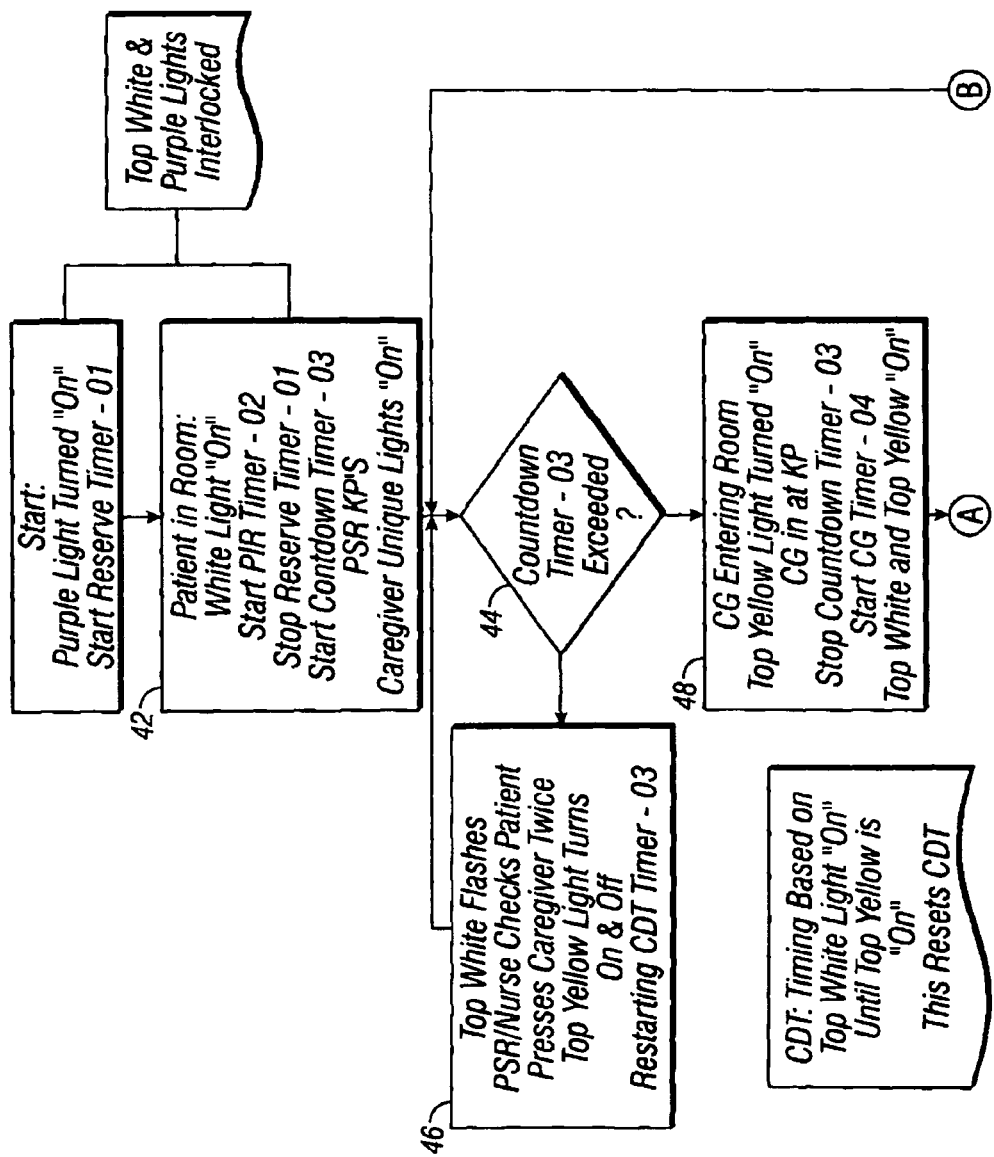
FIG. 2 is a flow chart useful in explaining the operation of the embodiment of FIG. 1.
Figure 2:
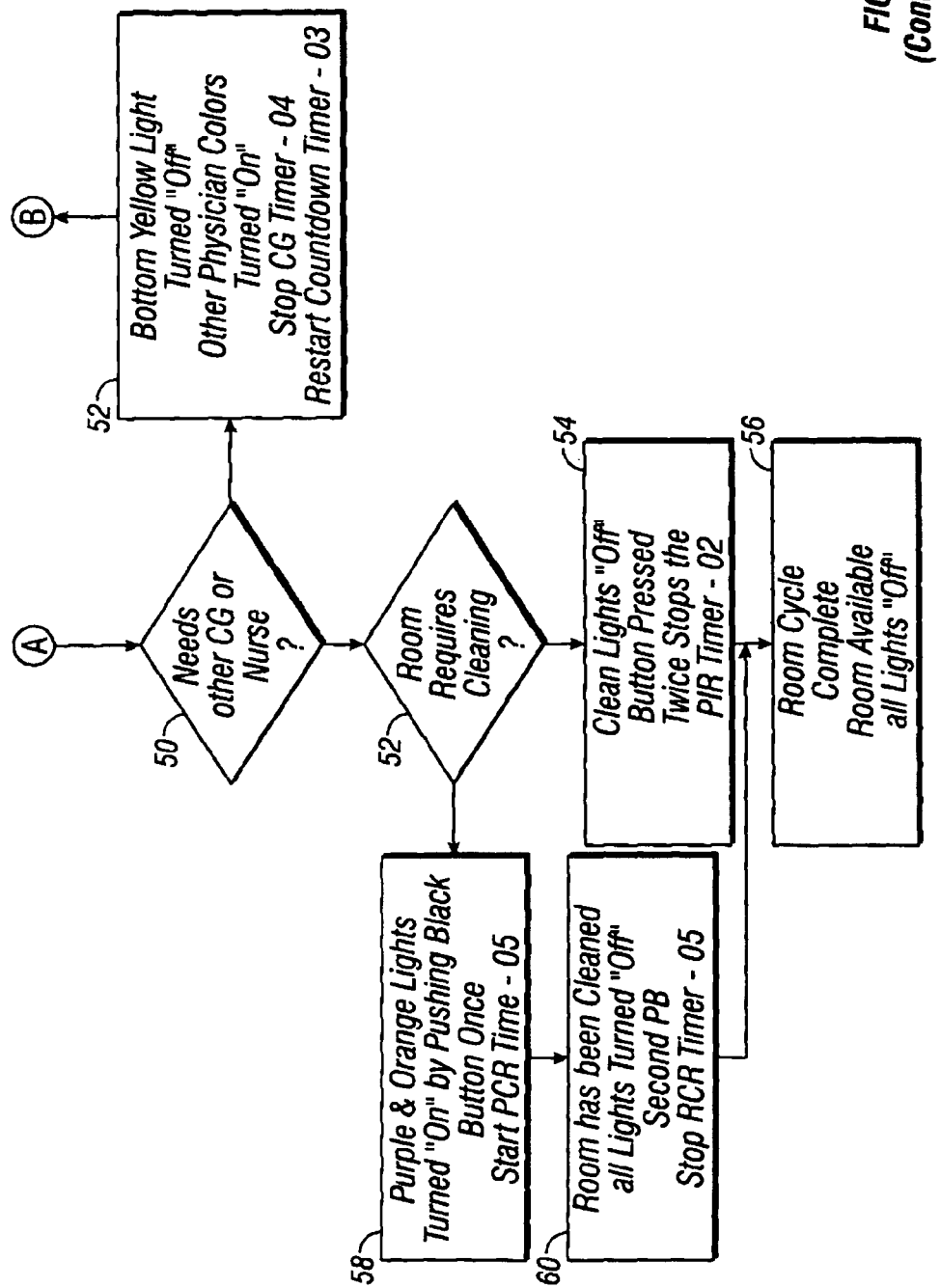

Whenever the countdown timer has not reached its maximum, causing the event noted above to occur, a caregiver entering the room at 48 in FIG. 2 pushed the "caregiver in" button to stop the countdown timer. This then causes the yellow light to be turned on immediately above the room number display; and the white lights remain on, and the icon in the icon window is turned from white to yellow. It should be noted that the countdown timer for establishing how many minutes the patient is in the room before a caregiver enters the room is based on the top white light being on until the top yellow light is turned on. When these two events coincide, the PIR countdown timer is reset to zero and is held there.

Figure 11:
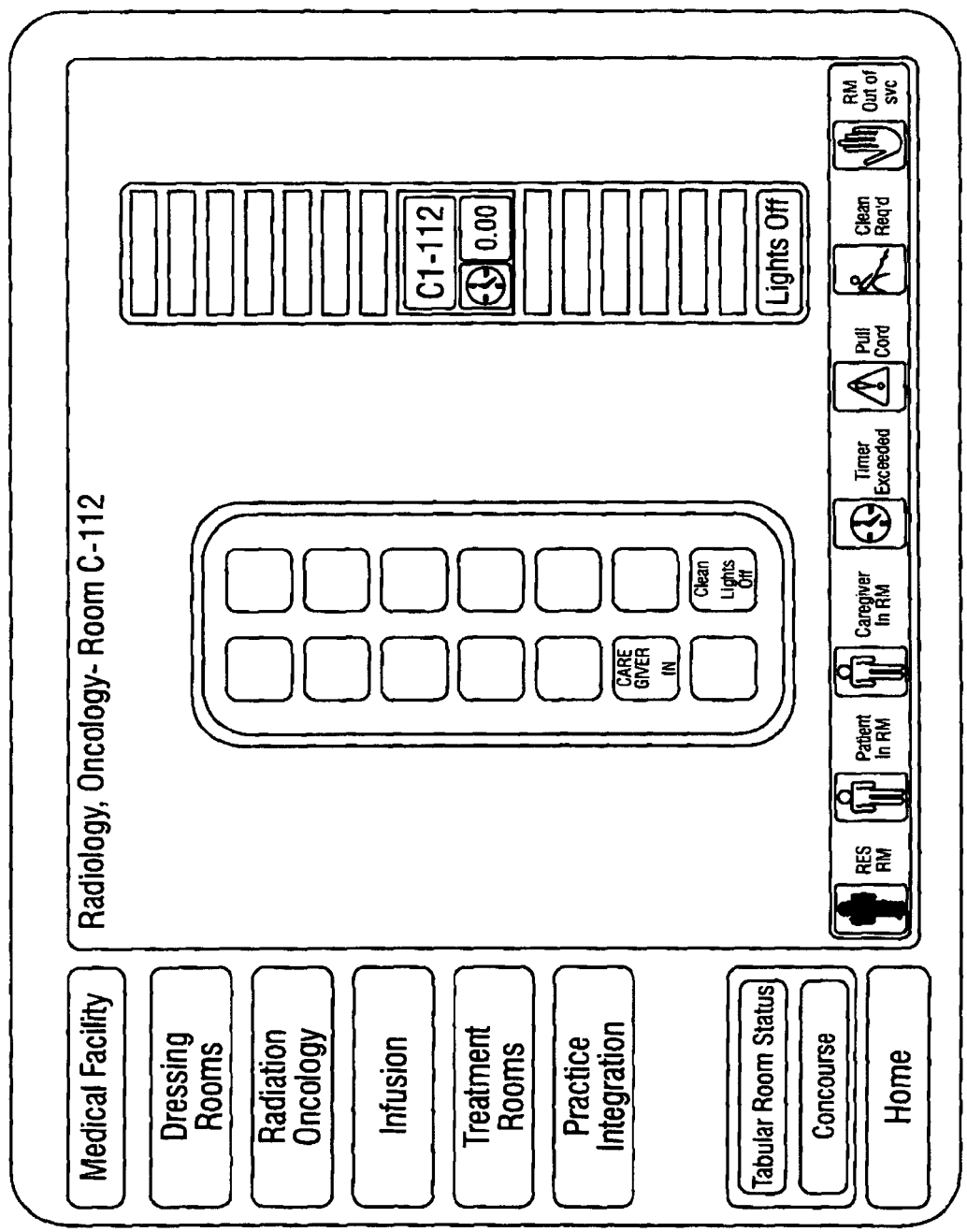
Figure 12:
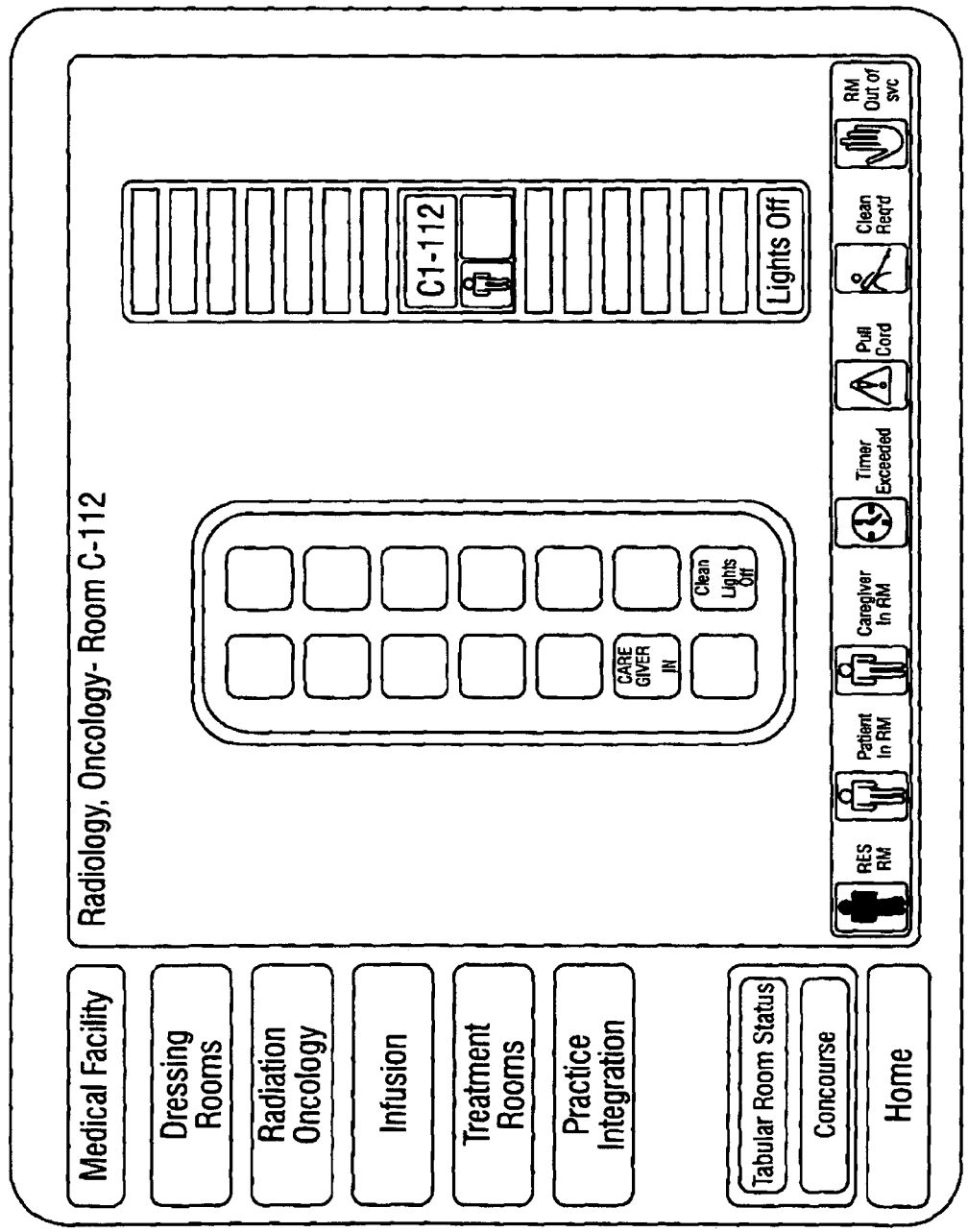

If another caregiver or a nurse is needed at 50, a push button on the display panel is depressed; and the bottom yellow light is turned off at 52. The other physician color, such as the red one shown in FIG. 11, is either turned on or continues to be turned on. The caregiver timer is stopped; and the countdown timer once again is started, as shown by the arrow returning from block 52 to the top of block 44 in FIG. 2.

Once the caregiver indicated by the colored bar (red in FIG. 11) enters the room and presses the top yellow button on the control panel, the countdown timer is turned off; but the timer is turned on and runs to show the duration of the time the provider is in the room.

When everything is finished, the selection from 50 is that no other caregiver or nurse is required; and the patient and caregiver leave the room. A decision is made at 52 as to whether or not the room requires cleaning. If it does not, the "clean-lights off" button on the panel is depressed at 54, stopping the PIR timer. Depressing this button a second time shows that the room cycle is complete and that the room is available at 56. This condition is depicted on the status of the light tower sconce shown on the right-hand side of FIG. 14.

Figure 13:
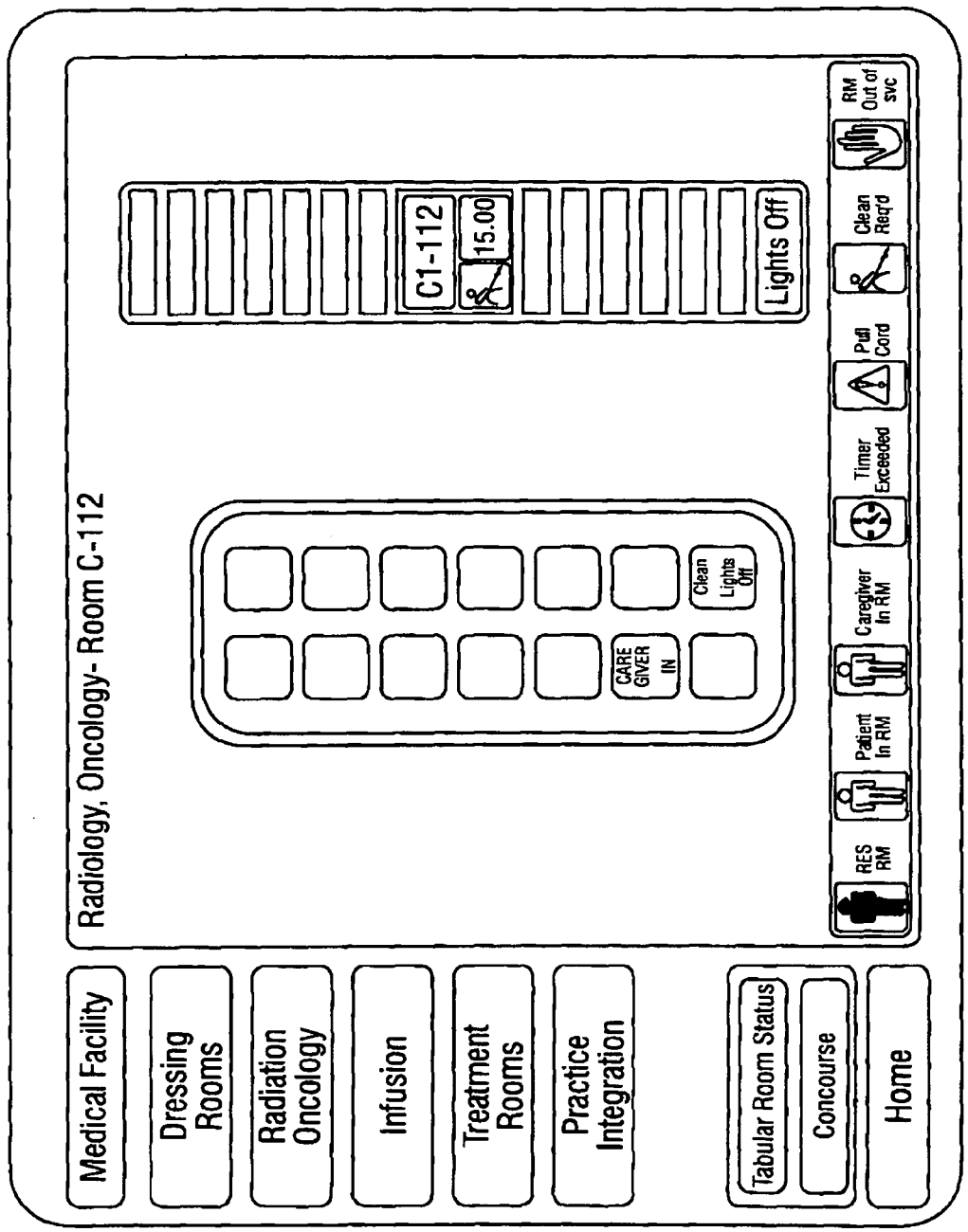
Figure 14:
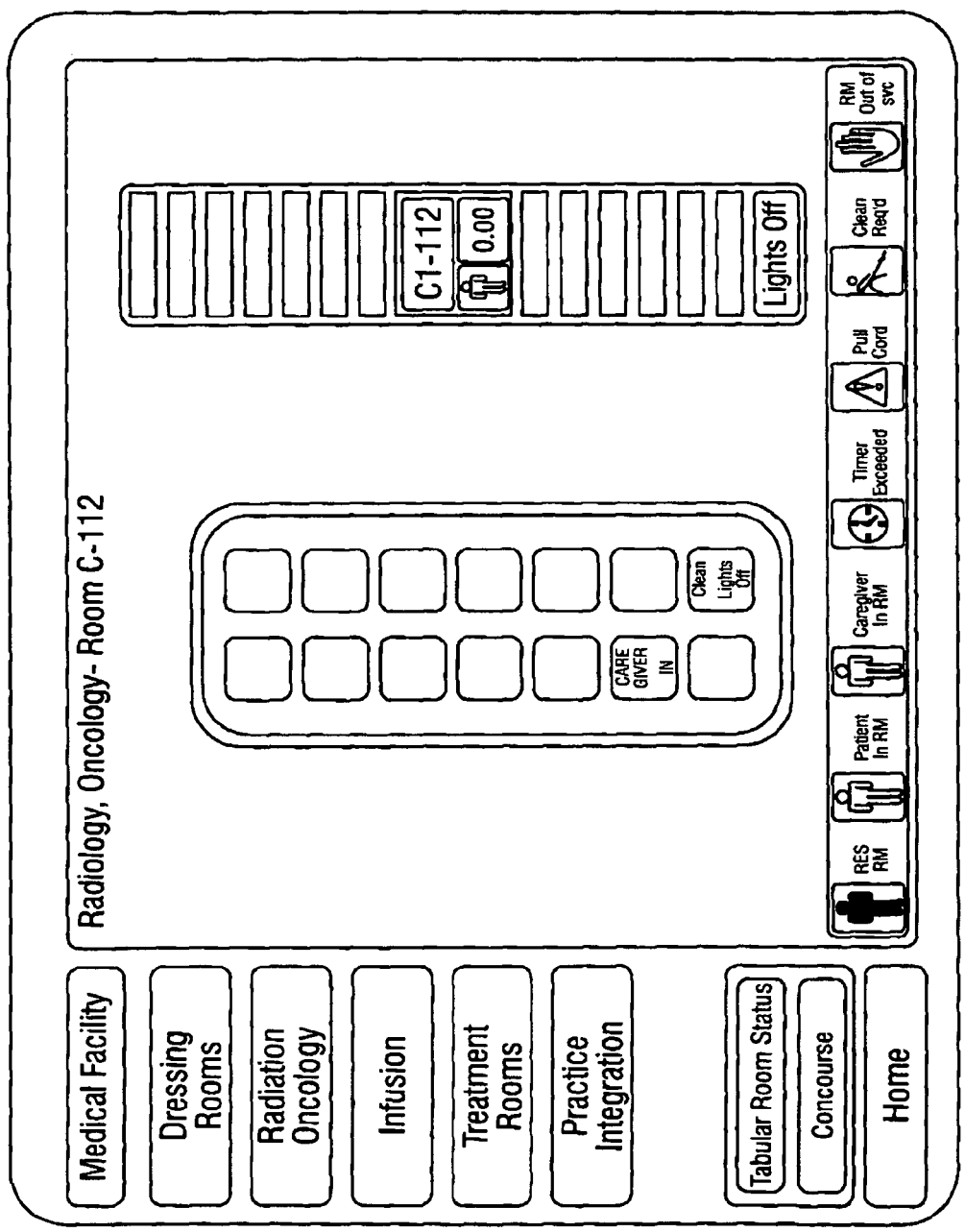

If the room does require cleaning at 52, the indication is made by pushing the "clean-lights off" button once at 58. This turns on the purple and orange light bars, as shown in FIG. 13 and starts a room cleaning timer (RCR). Also, note in FIG. 15, that the icon for cleaning the room is displayed on the light tower sconce. After the room has been cleaned, the "clean-lights-off" button is pressed a second time at 60, and the room cycle is complete with the room available and all lights off indication at 56, as again shown in FIG. 14.

The foregoing system provides a highly flexible, visible monitoring system for managing and monitoring the status of an examination room (or other room) at any given time. The nature of personnel in the room and whether a caregiver is present with a patient or not is readily ascertained by the status of the light bars on the outside of the room. In addition, the particular caregiver represented by the different color bars below the room number also is ascertained at the room itself, as well as available at the monitoring station 26. By coupling the various timers and status indicators with a time-of-day clock, the data concerning the usage and occupancy of the room throughout all of the different hours of a day may be monitored and stored in a data bank. This information then subsequently can be retrieved and used for management purposes to determine the extent of usage and the manner of utilization of the rooms. Based on this data, decisions can be made for determining a more effective work flow and usage of rooms and/or whether additional facilities need to be obtained. Even without this reporting information, the work flow of the particular examination rooms in any given facility is greatly enhanced by means of the ability to monitor the status of all of the rooms at any given time, both from a location outside the door of each examination room, as well as at a central monitoring station 26.

EXAMPLE

A manual method and the inventive method were performed to assess room utilization and the costs of the methods. The manual method (for six rooms at a time) has a junior financial analyst at a salary of $25/hr watching the rooms and recording times on paper with pen and stopwatch to observe room uses for eight hours per day and five days a week to determine variation by day as well as within the day, e.g., morning versus afternoon. Data gathering for one week on the small sample of six rooms would total $1000 in cost. In the case where the facility has 180 rooms and one week's worth of data is collected, the cost is $30,000. For planning major changes such as reallocating rooms to a different specialty, reconfiguring or new constructions, longer periods of data collection are needed if not essential, because of seasonal changes, market trends, etc. Collecting data on the 180-room facility for three months costs $390,000; for six months costs $780,000; and for a whole year costs $1,560,000. Assuming that processing the raw data and producing spreadsheets and charts takes one day per two weeks of data collection per person, providing reports on three months of data costs $39,000, on six months of data costs $78,000, and on a year of data costs $156,000. Hence, just a three-month study costs $429,000; a six-month study costs $858,000; and a year-long study costs $1,716,000.

In contrast, after the inventive system is installed (for the sake of comparison, estimated at $900,000), computing one year's worth of data on all 180 rooms could be accomplished in two to three hours (at a cost of $50-75). Moreover, once the data are available on the inventive system, numerous other reports can be efficiently produced to improve many aspects of facility management. Plus the same data can be used to provide important benefits in patient satisfaction, caregiver confidence and management control of efficient utilization and appropriate staffing.

Another important benefit is that running averages that can be computed. Weekly recomputation could quickly uncover increased utilizations of certain specialties due to flu epidemic, allergies, etc. The inventive apparatus and system enable timely reallocation of rooms: Better preparedness can now be accomplished on the fly. In contrast, the pencil and stop watch method would require continuing laborious expenditures like those described above and timely reports may not be available.

The foregoing description of an embodiment of the invention is to be considered as illustrative and not as limiting. Various changes and modifications will occur to those skilled in the art for performing substantially the same function, in substantially the same way, to achieve substantially the same result, without departing from the true scope of the invention.

The invention claimed is:

1. An apparatus for observing utilization of one or more rooms, comprising:
   at least one visibly indicating display adapted for location proximate a room and adapted for indicating at least one room status value selectable from a plurality of room status values;
   a manually operable input device operatively coupled to said display and adapted for selecting said at least one room status value selected from said plurality of room status values; and
   a timer operatively coupled to said input device, operatively coupled to said display, and adapted, with reference to said plurality of room status values, to select a predetermined second room status value when a predetermined time period has elapsed after a first room status value has been selected, except when a third room status value is selected from said plurality of room status values during said predetermined time period.

2. The apparatus of claim 1, further adapted to provide a machine-retrievable data record of room status values for a room with respect to time.

3. The apparatus of claim 1, further comprising a visibly indicating and manually operable central control station, operatively coupled to said display, said input device and said timer, adapted for indicating at least one room status value selectable from a plurality of room status values, and adapted for selecting said at least one room status value.

4. The apparatus of claim 1, wherein said predetermined plurality of status values includes at least one provider identifier.

5. The apparatus of claim 1, wherein said predetermined plurality of status values includes at least one status value selected from the set including "reserved room," "patient in room," "caregiver in room," "timer exceeded," "cleaning required," "pull cord," and "room out of service."

6. The apparatus of claim 1, wherein said display further comprises a plurality of lights, respective ones of said lights corresponding to respective ones of said room status values.

7. The apparatus of claim 1, wherein said input device further comprises a plurality of momentary contact switches, respective ones of said switches corresponding to respective ones of said room status values.

8. The apparatus of claim 1, wherein said timer is adapted to select the second status value "timer exceeded" when a predetermined time period has elapsed after a first room status value of "patient in room" or "cleaning required" has been selected.

9. The apparatus of claim 5, further comprising a manually operable pull-cord alarm located proximate a room, operatively coupled to said display, and adapted to select the room status value "pull cord" when manually operated.

10. The apparatus of claim 3, wherein said monitoring station is adapted to display a plurality of room status values of a plurality of rooms, respective ones of said plurality of displayed room status variables being discernibly associated with respective ones of said plurality of rooms.

11. A method of managing utilization of one or more rooms, having the steps of:
    selecting proximate a room at least one first room status value selectable from a plurality of room status values;
    displaying proximate said first room said selected room status value; and
    automatically selecting a second room status value selectable from said plurality of room status values when a predetermined time period has elapsed after a first room status value has been selected, except when a third room status value is selected from said plurality of room status values during said predetermined time period.

12. The method of claim 11, further comprising the step of providing a machine-retrievable data record of a room status values for a room with respect to time.

13. The method of claim 11, further comprising at least one step selected from the set of steps including (a) at a central station selecting a room status value, and (b) at said central station and proximate said room indicating said selected room status value.

14. The method of claim 11, wherein a room status value includes at least one provider identifier.

15. The method of claim 11, wherein said predetermined plurality of status values includes at least one status value selected from the set including "reserved room," "patient in room," "caregiver in room," "timer exceeded," "cleaning required," "pull cord," and "room out of service."

16. The method of claim 11, further comprising the step of illuminating at least one of a plurality of lights, respective ones of said lights corresponding to respective ones of said room status values.

17. The method of claim 11, further comprising the step of operating one or more of a plurality of momentary contact switches, respective ones of said switches corresponding to respective ones of said room status values.

18. The method of claim 11, said step of automatically selecting comprising selecting the second status value "timer exceeded" when a predetermined time period has elapsed after a first room status value of "patient in room" or "cleaning required" has been selected.

19. The method of claim 15, further comprising the step of manually operating a pull-cord alarm located proximate a room and operatively coupled to said display, and selecting the room status value "pull cord" when said pull-cord alarm is operated.

20. The method of claim 13, further comprising the step of displaying at said monitoring station a plurality of room status values of a plurality of rooms, respective ones of said plurality of displayed room status variables being discernibly associated with respective ones of said plurality of rooms.

* * * * *